(12) United States Patent
Goehnermeier (10) Patent No.: US 11,933,597 B2
(45) Date of Patent: Mar. 19, 2024

(54) SYSTEM AND METHOD FOR OPTICAL OBJECT COORDINATE DETERMINATION

(71) Applicant: Carl Zeiss Industrielle Messtechnik GmbH, Oberkochen (DE)

(72) Inventor: Aksel Goehnermeier, Essingen-Lauterburg (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 350 days.

(21) Appl. No.: 17/162,758

(22) Filed: Jan. 29, 2021

(65) Prior Publication Data

US 2021/0247175 A1 Aug. 12, 2021

(30) Foreign Application Priority Data

Jan. 30, 2020 (DE) ...................... 10 2020 201 097.8

(51) Int. Cl.
| | |
|---|---|
| *G01B 11/00* | (2006.01) |
| *G06T 7/70* | (2017.01) |
| *H04N 23/67* | (2023.01) |
| *H04N 23/80* | (2023.01) |

(52) U.S. Cl.
CPC .............. *G01B 11/002* (2013.01); *G06T 7/70* (2017.01); *H04N 23/67* (2023.01); *H04N 23/80* (2023.01)

(58) Field of Classification Search
CPC ............................. G01B 11/002; H04N 23/80
USPC .......................................................... 348/135
See application file for complete search history.

(56) References Cited

U.S. PATENT DOCUMENTS

| | | | |
|---|---|---|---|
| 5,082,362 | A | 1/1992 | Schneiter |
| 5,627,635 | A | 5/1997 | Dewan |
| 9,055,237 | B1* | 6/2015 | Chang ...................... H04N 9/31 |
| 9,726,876 | B2 | 8/2017 | Bryll |
| 10,706,562 | B2 | 7/2020 | Haverkamp et al. |
| 10,809,378 | B1 | 10/2020 | Gladnick et al. |
| 2005/0008324 | A1* | 1/2005 | Balogh .................. H04N 5/913 |
| | | | 386/252 |

(Continued)

FOREIGN PATENT DOCUMENTS

| | | |
|---|---|---|
| DE | 4121538 A1 | 1/1992 |
| DE | 10 2014 2233 87 A1 | 5/2015 |

(Continued)

OTHER PUBLICATIONS

Imaging properties of extended depth of field microscopy through single-shot focus scanning, Lu et al., Optics Express 10731, Apr. 20, 2015, 18 pages.

*Primary Examiner* — Amir Shahnami
(74) *Attorney, Agent, or Firm* — Miller Johnson (57) ABSTRACT

A system for optical measurement of an object includes a radiation generating device, a capturing device, and an evaluation device. The radiation generating device is configured to emit electromagnetic radiation onto the object. The capturing device includes an image sensor. The capturing device is configured to capture a measurement image as a result of an exposure of the image sensor with radiation returned from the object. The capturing device is configured to vary a focus setting (D) during the exposure. The evaluation device is configured to determine coordinates of at least one location on the object based on the captured measurement image.

17 Claims, 1 Drawing Sheet

(56) References Cited

U.S. PATENT DOCUMENTS

| | | | | |
|---|---|---|---|---|
| 2009/0103068 | A1* | 4/2009 | Yu | G03F 7/70858 |
| | | | | 355/56 |
| 2010/0007719 | A1* | 1/2010 | Frey | G06T 7/593 |
| | | | | 348/46 |
| 2010/0134600 | A1* | 6/2010 | McKeon | G06V 20/653 |
| | | | | 348/47 |
| 2010/0157266 | A1* | 6/2010 | Zimmermann | G03F 7/70333 |
| | | | | 355/53 |
| 2012/0300114 | A1 | 11/2012 | Isogai et al. | |
| 2014/0038316 | A1* | 2/2014 | Fulle | H01L 22/24 |
| | | | | 250/341.4 |
| 2015/0015852 | A1* | 1/2015 | Furui | H04N 9/3194 |
| | | | | 353/121 |
| 2015/0116502 | A1* | 4/2015 | Um | G06T 7/292 |
| | | | | 348/169 |
| 2017/0329208 | A1* | 11/2017 | Takahashi | H04N 9/3185 |
| 2017/0359536 | A1* | 12/2017 | Lee | H04N 25/617 |
| 2019/0018169 | A1* | 1/2019 | Aschwanden | H01L 27/14607 |

FOREIGN PATENT DOCUMENTS

| | | |
|---|---|---|
| DE | 10 2015 214 857 A1 | 2/2017 |
| EP | 3278302 B1 | 7/2019 |

* cited by examiner

SYSTEM AND METHOD FOR OPTICAL OBJECT COORDINATE DETERMINATION

CROSS-REFERENCE TO RELATED APPLICATIONS

This application claims priority to German Application No. 10 2020 201 097.8 filed Jan. 30, 2020. The entire disclosure of the application referenced above is incorporated by reference.

FIELD

The present disclosure relates to industrial metrology and more particularly to optical object measurement.

BACKGROUND

It is known to capture object surfaces for example of industrially produced workpieces by way of optical sensors (that is to say without contact). In this way, data can be acquired for measuring and/or imaging the object surface. Measuring typically comprises measuring the object surface in the depth dimension thereof (for example what is known as a Z-dimension) and/or generally determining three-dimensional properties of the object surface. In particular, information relating to a distance between the object and the optical sensor can be ascertained by way of the measuring, and the measurement values obtained can be combined in the form of what are known as 3D point clouds. As a result, the three-dimensional properties and in particular the spatial coordinates of an object surface can thus be determined, such as the shape thereof. In particular, the measurement values can be used to determine dimensions and geometric variables (such as diameter or width), to compare the results with specifications and to assess them, to calculate properties of the object (for example quality parameters), and/or to produce a three-dimensional graphic representation of the object and/or to duplicate the object even without a CAD drawing (so-called reverse engineering).

Optical sensors are used to measure the object surface. Laser sensors are one type of optical sensors; they emit laser radiation, direct it onto the object surface (i.e. radiate it onto the object) and capture a portion of radiation returned (i.e. reflected and/or scattered) from the object surface. The emitted radiation is here typically moved in relation to and along the object surface so as to scan the latter without contact. Apparatuses having such a laser sensor are also referred to as laser scanners. The relative movement between radiation and object can be accomplished by moving the laser sensor, which can be implemented automatically, supported by machinery, and/or with manual movement of a handheld laser sensor. Movable optical units that guide the radiation along the object surface, for example by way of movable mirrors, can be provided additionally or as an alternative.

Laser sensors, or laser scanners, emit electromagnetic radiation in the form of laser radiation having typically just a single defined wavelength or a single defined wavelength range. The incident radiation forms on the object surface a measurement region, which may be point-shaped or line-shaped, for example. The measurement region generally contains a plurality of measurement points (i.e. locations) that are located on the object surface and for which a measurement value is to be ascertained in each case. The incident laser radiation is reflected and/or scattered by the object surface (or by the measurement points) and captured by a suitable capturing device of the sensor (for example comprising a camera).

Next, a distance (or Z-value) between the capturing device and the object surface can be determined as distance information in a manner which is known per se. This can be accomplished using triangulation principles. With knowledge of e.g. a position of the laser scanner, a current position of a movable optical unit thereof that may be present, and/or a position of a measurement point currently being measured on the object surface (for example in the horizontal or X-Y spatial plane), it is furthermore possible to determine the complete 3D coordinates of the measured point on the object surface. The information that has been determined overall in this way for an object surface can be combined into a 3D data set or a 3D point cloud, which has already been mentioned. In a superordinate way, on the basis of the distance information, for example, it is also possible to determine depth information of the object surface, for example in an object coordinate system. The term depth information can be employed in particular when the object surface extends as usual transversely to the propagation direction of the radiation that is incident on the object surface and is reflected and/or scattered by the object surface.

An example of establishing a three-dimensional model of an environment by way of laser scanning can be found in DE 10 2015 214 857 A1. In this case, too, a discrete set of measurement values for scanning points (or measurement points), which is referred to as a point cloud, is produced. The coordinates of the measured points are determined from the angles and the distance in relation to an origin, wherein the location of the laser scanner can be considered to be the origin.

Measuring arrangements of the above type typically comprise a projection device (or radiation generating device) for emitting electromagnetic radiation and a capturing device comprising an optical unit (comprising e.g. at least one lens (element)) and comprising an image sensor (e.g. a CCD or CMOS sensor).

It is known that in order to obtain sharp imagings (i.e. in order to capture sharp images), generally it is necessary to comply with the so-called Scheimpflug condition. For this purpose, the plane of the image sensor, of the lens element and of the object (as defined by the projection device) must intersect at a common point. This is shown by way of example for optical object measurement and, more precisely, laser triangulation in DE 41 21 538 A1, in particular in association with FIGS. 3A, 3B, and 4 therein. Further background concerning the Scheimpflug condition for the present case of application can be found in U.S. Pat. No. 5,627,635 A.

In summary, the Scheimpflug condition to be complied with in order to obtain sharp imagings, requires the image sensor, the object or the projection device and the optical unit to be oriented relative to one another in a specific way.

In the case of real measurement tasks, on account of surface unevennesses or component topographies, for example, it may be necessary for the radiation emitted by the projection device to be directed onto the object in a predetermined way and in particular with a predetermined direction. Otherwise, specific surface regions may not be able to be irradiated or may be masked. However, if the orientation of the projection device is changed accordingly, the orientations of image sensor and/or optical unit must also be suitably adapted in order to comply with the Scheimpflug condition.

This is done by way of mechanical actuating mechanisms in the solutions in DE 41 21 538 A1 and U.S. Pat. No. 5,627,635 A outlined above, in the case of which mechanisms, for example, the image sensor is tilted depending on the orientation of the projection device. Alternatively or additionally, the object can also be tilted relative to the projection and capturing devices by means of measuring table actuators, for example.

However, such solutions in which orientations of the relevant components are actively adapted in order to comply with the Scheimpflug condition are often distinguished by a certain susceptibility to disturbances, inaccuracy and also, on account of the movements to be carried out, by a comparatively long measurement duration.

It is thus an object of the present invention to improve optical object measurements, in particular with regard to accuracy, speed and/or susceptibility to disturbances.

This object is achieved by means of an arrangement, a use and a method as claimed in the accompanying independent claims. Advantageous developments are specified in the dependent claims. The features and explanations mentioned in the introductory description, individually or in any desired combination, can also be provided in or apply to the presently disclosed solution, provided that nothing to the contrary is indicated or evident.

It has been recognized according to the invention that there is a possibility for limiting or even completely eliminating active orientation adaptations of the relevant arrangement components in particular if the requirement of particularly precise compliance with the Scheimpflug condition is dispensed with.

In this regard, it is the case for conventional photographic apparatuses or cameras, for example, that the Scheimpflug condition can be disregarded as soon as the depth of field of the imaging optical unit is large enough and covers the region traversed by the laser projection plane in the field of view of the optical unit. The depth of field can generally be understood to mean that region of the object space which is imaged sufficiently sharply in a captured image (which sharply images e.g. a desired minimum number of line pairs per millimeter). What is disadvantageous here, however, is that with greater depth of field the optical resolution of the imaging also decreases and the measurement accuracy is thus detrimentally affected.

One possible approach would be, by means of autofocus approaches, for example, to adapt a focus distance of an object capturing device depending on the object region currently to be captured (in particular depending on the current distance with respect to the object surface). Consequently, despite a reduced depth of field, the corresponding object region could then always be imaged sharply, still with high resolution, even if the Scheimpflug condition is not satisfied in the narrower sense.

The use of autofocus approaches is not very practicable, however, since once again this is susceptible to disturbances and requires a certain duration until a correct focus distance has been set. This is not integratable in an expedient way particularly when measuring large workpieces that are intended to be captured in a scanning fashion by means of a preferably uninterrupted relative movement of capturing devices and workpieces.

Instead, it has been recognized according to the invention that a focus setting of the capturing devices can advantageously be varied in the context of a single image recording and, more precisely, during a single image sensor exposure process (or, in other words, temporally in parallel therewith). A so-called focus scanning image (or SSFS image, "Single-Shot Focus Scanning") is then obtained. In this case, a focus setting of the image capturing device, in particular the working distance, is varied during the image recording (that is to say during a continuous uninterrupted exposure). Background concerning such image capturing can be found in the following scientific article: "Imaging properties of extended depth of field microscopy through single-shot focus scanning", Lu et al., OPTICS EXPRESS 10731, 20 Apr. 2015, doi: 10.1364/OE.23.010714.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Generally, an exposure explained herein can comprise recording values (in particular intensities) captured by the image sensor and, more precisely, storing them, for example as part of an image file. Therefore, this does not involve temporary recording and/or recording without an image file finally produced, such as might take place for example for (preferably real-time) reproduction of a current image segment on a display device in preparation for the actual image capturing.

To put it another way, capturing can be understood also to mean herein generating and storing a subsequently retrievable image file and the exposure can take place for the purpose of generating said image file. In this case, one and the same image file is produced on the basis of different focus settings, that is to say that each pixel value produced during an exposure is influenced by information or measurement signals and/or exposure portions which were captured (and/or recorded) with or in the case of at least two different focus settings. The radiation and/or intensity values captured in the case of each focus setting are thus superposed in the image file finally produced. This, too, differs from real-time reproduction, which involves always exclusively displaying the intensity value recorded in the case of a currently captured focus setting and subsequently discarding it again.

This differentiates the presented solution from subsequent image processing methods such as focus stacking, which involves combining images which were recorded temporally separately and were recorded with different focus settings. The latter occurs, moreover, in regard to artistic standpoints rather than, as in the present case, for object measurements and, in particular, for triangulation or determining depth information.

There exist processing algorithms, which are likewise explained in said article and in the references cited therein, serving, on the basis of a focus scanning image explained above, to generate an image with an enhanced depth of field (referred to herein as measurement image) and, more precisely, to calculate such an image.

Such resultant or calculated images with an enhanced depth of field are often referred to as EDOF images (Enhanced Depth of Field). Traditionally, however, EDOF images are generated from a plurality of individual recordings in which the focus settings of the individual recordings differ from one another. Such a progressive recording of a plurality of images one after another requires once again a certain measurement duration that may be unsuitable for capturing objects in a scanning fashion.

As mentioned, the invention preferably does not involve capturing and evaluating a plurality of individual images, but rather involves carrying out a single image recording in order to produce a single image file, in the course of which however the focus setting is varied (i.e. the focal plane during the ongoing exposure and image capturing over a scanning region or a scanning depth is varied). With modern optical units (e.g. comprising a MEMS mirror array or an acousto-optical lens), as again outlined in the above article, even when capturing objects in a scanning fashion it is possible to provide sufficiently high focusing speeds or variation speeds of the focus setting.

With a corresponding image recording, the probability of the relevant sharpness or depth information being contained in the recording is increased. The latter can then be determined and/or used by means of known image evaluation algorithms for determining an image with an enhanced depth of field. To put it another way, the probability is increased that the correct focus setting for a sharp imaging will likewise be implemented during the image recording and influence the captured recording.

It is therefore not necessary to ensure from the outset a sufficiently sharp imaging by mandatory compliance with the Scheimpflug condition or by implementing correct (auto) focus settings from the outset. Instead, such requirements can as it were be circumvented.

According to the invention and as delimitation from previous optical object measurements and in particular previous laser triangulations, provision can thus be made for carrying out an optical object measurement by means of capturing a focus scanning image. It is then possible to dispense with ensuring precise compliance with the Scheimpflug condition, and in particular ensuring compliance therewith by constant adaptation of the orientations of the relevant components.

This simplifies the system set-up, reduces the complexity and can thus also reduce the susceptibility to disturbances. At the same time, in particular by means of the preferred computational or recording-technological determination of a measurement image with an enhanced depth of field, a sufficient measurement accuracy can be ensured. Furthermore, a high measurement speed is achieved and, in particular, a workpiece surface can be scanned uninterruptedly at least in sections. In this regard, the invention can provide for choosing the speed of the focus variation to be higher than the speed of a scanning movement (i.e. of a displacement movement) of the sensor relative to the workpiece. This can be achieved particularly effectively if the capturing device (in particular an optical unit thereof) comprises a MEMS mirror array, explained below.

In detail, an arrangement for optical object measurement is proposed, comprising:
- at least one radiation generating device (or, alternatively expressed, a radiation source or projection device) configured to radiate electromagnetic radiation onto the object (or, alternatively expressed, to project electromagnetic radiation onto the object);
- an (object) capturing device comprising an image sensor, said capturing device being configured to capture a measurement image (and more precisely a focus scanning image or SSFS image) as a result of exposure of the image sensor with radiation returned (in particular in the direction of the capturing device) from the object (i.e. reflected and/or scattered radiation and, more precisely, with a radiation portion of the incident radiation that is reflected/scattered from the object, and said capturing device furthermore being configured to vary a focus setting (e.g. the position of an image plane or object plane and/or a focal length and/or a focus distance) during the exposure in particular of an individual image (i.e. of an individual image file to be produced);
- an evaluation device configured to determine coordinates of at least one location of the object on the basis of the captured measurement image.

The radiation generating device can comprise a beam source and/or a radiation shaping optical unit. The electromagnetic radiation can be laser radiation having a defined wavelength or a defined wavelength spectrum. In particular, the incident radiation can be monochromatic (i.e. contain just one wavelength) and/or coherent at least within a measurement region of the apparatus. Generally, wavelength ranges generated by the radiation generating device in the case of monochromatic radiation can thus comprise just a single wavelength.

A suitable beam source is in particular a laser diode (or a diode laser). The latter can be stabilized and/or comprise an external resonator. The coherence length of the laser diode can be a number of centimeters or at least 1 m.

The incident radiation can define on the object, in a manner known per se, a measurement region that can be punctiform, linear or areal. The measurement region can then also be imaged or projected with a corresponding shape on the object surface. The coordinates mentioned can be determined for points (measurement points) of the object surface that lie within the measurement region.

By way of example, a (preferably rectilinear) linear and/or one-dimensional measurement field can be defined or formed by a juxtaposition of individual measurement points. The width of such a measurement field cannot exceed a size or a diameter of the measurement points, or can exceed it only slightly. To put it another way, there can only be individual measurement points along the measurement field, or, in other words, in the longitudinal direction of the measurement field, without for example a plurality of measurement points being juxtaposed transversely to the longitudinal direction of the measurement field.

Preferably, provision is made for measurement values to be produced and, more precisely, coordinates to be determined substantially simultaneously for the measurement points on the object surface. A region of the object surface that is covered by the measurement region is then measurable substantially in a single step.

The measurement points (or scanning points) can generally be those locations or sites in the measurement field and thus on the object surface at which or, to put it another way, for which a measurement value is to be produced. The measurement value can be a distance measurement value between the apparatus and the object surface (e.g. in the form of a Z-value or depth information) or it can indicate the complete coordinates of this location. If such measurement values are arranged analogously to the measurement points in the measurement field or, to put it another way, are juxtaposed in an analogous manner, it is possible, on the basis thereof, for the measured region of the object surface to be imaged graphically, for example.

The image sensor can alternatively be referred to as a photosensitive or imaging unit of the capturing device. Generally, the capturing device can have at least one camera (in particular a digital camera) comprising the image sensor. By way of example, the image sensor can be a CCD or CMOS sensor. Additionally or alternatively, it can generally be embodied in an areal fashion and be subdivided preferably into rows and columns.

The image sensor can comprise a plurality of pixels, for which, for example, individual intensity values are able to be captured in each case. The pixels can each have a specific row and column position (or, in other words, defined row and column coordinates in an image or pixel coordinate system). The intensity of the returned radiation captured can be recorded as an intensity value.

The capturing device can have at least one optical filter in order to allow substantially only (or at least predominantly) radiation having the wavelength of the incident radiation to impinge on the image sensor. Disturbing influences for example of ambient light can be reduced in this way. Alternatively or additionally, the photosensitive unit can be embodied in a monochromatic fashion and/or capture only a limited wavelength range comprising a few tens of nanometers (e.g. not more than 50 nm or 100 nm). Said range is then preferably in the wavelength range of the incident electromagnetic radiation and/or outside the wavelength range of (in particular visible) ambient light.

The focus setting can be varied in accordance with known SSFS approaches outlined in the introduction. In particular, when the stop of the capturing device is open and/or with continuous sensor exposure or during the exposure time duration, the focus setting can be varied. This can be referred to as scanning a certain focus region, that is to say as displacing a focal plane within and/or over a corresponding scanning region. Hereinafter, therefore, instead of variation of the focus setting, the term focus scanning will also be employed and reference will be made to corresponding scanning regions.

In this way, firstly, a generally unsharp and low-contrast SSFS image can be recorded. Said image can then be converted or processed to form an image with a computationally or artificially increased depth of field. The image obtained, which is referred to herein as a measurement image, can therefore also be referred to as an EDOF image, even if the initial capture of the initial image (SSFS image) is not effected by means of traditional EDOF approaches (e.g. is not effected by capturing a plurality of independent images which were each recorded with different focus settings and computed with one another in a targeted manner according to sharpness criteria).

The captured object location coordinates are also referred to herein as a measurement value. They are preferably spatial (i.e. three-dimensional) coordinates, for example within a Cartesian coordinate system. The coordinates can be determined by means of known triangulation algorithms, for example on the basis of a known (for example structurally defined) triangulation angle. Furthermore, a location of impingement on the image sensor as outlined below can be determined for the purpose of coordinate determination.

Generally, the evaluation device can comprise at least one processor device and/or at least one storage device. It can be digitally and/or electronically operable and be configured in particular to implement algorithms and/or program instructions for carrying out any coordinate determinations or other measurement processes outlined herein. It can be combined with the capturing device, for example, in a common module. Alternatively, it can be provided separately (for example as a separate computer) and be connected to at least the capturing device for signal transmission, for example in order to acquire from said capturing device the captured intensity values of the returned radiation.

At least the capturing device and the radiation generating device (but optionally also the evaluation device, see above) can be provided in a common module or housing, in particular in a manually handlable or machine-handlable module or a handheld device, such as a manually handlable laser line scanner, for example. In other words, the capturing device and the radiation generating device can be combined in one design. For handling by machine (i.e. a machine-bound use for example at a movement apparatus or a manipulator), such a module or housing can be arranged for example on a measuring machine, a robot or a machine tool.

In particular, the evaluation device, for applying triangulation principles, can be designed to determine a location of impingement of the returned radiation portions for each measurement point on the image sensor (e.g. computationally by Gaussian fitting as the location of maximum intensity or else as a so-called "peak"). A projected or incident measurement field for example in the form of a line can be imaged on the image sensor in a first dimension (e.g. column direction), wherein an individual measurement point can correspond to an individual position in a second dimension (e.g. row position) along said line or, to put it another way, can be imaged onto an individual row position. Alternatively, the line can also be imaged in the row direction, and the measurement point can have a column position. Along the respective dimension of the measurement point position (that is to say in the column or row direction), it is possible to capture an intensity distribution and it is possible to determine the location of impingement (e.g. as a pixel position) in particular as the abovementioned location of maximum captured intensity within the distribution.

When capturing the object surfaces, it is possible to capture and evaluate a plurality of individual recordings with a measurement field projected thereon (e.g. for each relative location or position of measurement field and object). The results for each individual recording can then be combined e.g. to form a 3D point cloud.

In this context, the solution disclosed herein is also advantageous to the effect that the corresponding location of impingement can be precisely demarcated. This is achieved by possibilities for computationally determining a measurement image with an enhanced depth of field from the unsharp focus scanning image initially captured.

An imaging with the greatest possible sharpness is not absolutely necessary, however, as long as the location of impingement explained above is sufficiently accurately determinable. It generally holds true that an intensity distribution and in particular its maximum or peak can also be formed in a more narrowly delimited way (i.e. as steeper and/or having a smaller standard deviation), the higher the sharpness. Consequently, the location of impingement with maximum intensity can also be determined precisely and a higher robustness vis à vis noise may be present. However, it is also possible to effect a satisfactory determination of said location of impingement with a limited imaging sharpness and with certain losses of accuracy being accepted.

In a superordinate way, the capturing device can be configured to produce a distance value between capturing device and object as or on the basis of a captured intensity (i.e. radiation flux density) of a returned (for example reflected and/or scattered) radiation portion. In particular, said intensity can be integrated over an exposure time duration, in particular in parallel with the variation of the focus setting. In a manner known per se, the preferably spatial coordinates can then be determined from said distance value and for example a known location of the capturing device. Generally, the distance value can be determined by means of triangulation and a conversion to spatial coordinates can be effected on the basis thereof, in particular by means of translation and rotation calculations.

Generally, the solution presented herein (that is to say the arrangement, the use and the method) can be used for a coordinate measurement and/or as or in or for a coordinate measuring machine. In this case, the arrangement and at least the capturing device can be moved relative to the object to be measured, in particular in order to carry out a scanning object measurement. However, it is also possible for the relative movement to be moved by moving the object through a (virtual) measurement region of the arrangement or for both the arrangement and the object to be actively moved.

In particular, provision can also be made for using the solution presented herein in the context of so-called inline measurements that involve measuring objects e.g. within a production line and/or while maintaining a conveying movement relative to a then typically stationary arrangement of the type outlined herein. All aspects presented herein are not restricted to use in coordinate measuring machines or in inline measurements, but can be limited to one of these variants, since they are preferably used there.

In accordance with one development, the evaluation device is configured to process and in particular to correct (in particular digitally) the measurement image in order to increase the depth of field and/or the image contrast. This processing can be carried out by means of image evaluation algorithms known per se, that is to say can be effected computationally and/or digitally. In particular, pixel or intensity values of an initially captured image (measurement image) can be corrected and/or adapted. Example processing or evaluation algorithms can be found in the article mentioned above and also the references cited therein.

With high depths of field, larger regions of the object (in particular along an optical axis and/or orthogonally to the object surface) can be more accurately imaged and measured, for example. Generally, provision can be made for the computationally or algorithmically produced and in particular increased product of resolution and depth of field to be greater than the depth of field that is theoretically possible or physically achievable with the capturing device for the same resolution, e.g. during an individual recording. In particular, in this way it is also possible to generate an EDOF image, explained above, which however was captured by means of SSFS image capturing. In the context of this disclosure, a resolution can generally be the number of individual pixels per length or row of the image plane.

The final evaluation by the evaluation device and thus the actual coordinate determination can then be effected on the basis of a correspondingly processed measurement image. Since more information is imaged therein in particular in a depth direction (i.e. orthogonally to the object surface), the coordinate determination can also be effected correspondingly precisely over a larger region.

In the context of the image processing, it is also possible to employ the procedure taught in a parallel application in the name of the present applicant with the same filing date and entitled "Image processing for enhancing the depth of field". In particular, it is possible to use the correction function outlined in that further application, which enables particularly advantageous image processing for increasing the depth of field and/or the image contrast. The corresponding disclosure, in particular all details and applications of said correction function that are outlined therein, is incorporated by reference herein.

As mentioned, the measurement image can be recorded when the projected radiation (or the measurement field generated thereby on the object surface) adopts a first position relative to the object. In the context of capturing objects in a scanning fashion, the radiation or the measurement field can subsequently adopt at least one further position relative to the object and a further measurement image can then be captured.

In accordance with a further variant, the evaluation device is furthermore configured to determine at least one location within the measurement image having an increased (in particular above average) intensity of the captured radiation (in particular a plurality of corresponding locations along a dimension along which the measurement field is imaged in the measurement image). In particular, the location can be a location of impingement on the image sensor or the location in the image can correspond to the location of impingement on the image sensor.

In a manner known per se, there can be a fixed relationship between locations in a captured image and locations on the image sensor, for example since the image can be composed of pixel values determined in a pixel coordinate system of the image sensor. These locations can thus be fixedly assigned to one another or correspond to one another (one specific image location can correspond to exactly one specific sensor location or location of impingement, and vice versa).

The increased intensity can be understood to be an intensity above a threshold value and/or above the intensity present on average in the measurement image. The threshold value can be predefined and/or generally be fixed independently of a measurement image specifically determined. Alternatively, the threshold value can be determined flexibly, e.g. as an average value and/or by averaging individual intensity values within the measurement image. In particular, the increased intensity can correspond to a maximum intensity of the captured radiation. In this case, the intensity can also be considered only in an individual row and/or column direction.

Generally, therefore, in the case of the present solution, provision can be made for determining locations of impingement of maximum intensity in at least one dimension (e.g. row or column direction) of a captured measurement image and for determining therefrom in each case at least one coordinate value for an object location.

Furthermore, provision can generally be made for the image capturing device to comprise at least one optical lens element (in particular a lens element of a lens). The latter can be arranged in a manner known per se between the image sensor and the object to be captured. It can generally be arranged with the image sensor in a common housing and/or module. A stop or a mechanical shutter can be situated between the optical lens element and the image sensor. If it is opened, the image sensor is exposed (when the stop is closed, the exposure correspondingly ceases). During the exposure, the image sensor can capture the incident radiation returned from the object. Alternatively or additionally, the exposure can also be controlled electronically in the image sensor.

In this context (but also independently thereof), provision can be made for the image sensor to be immobile relative to the projection device or else an optical lens element optionally present, at least during an object measurement and/or measurement image capturing. To put it another way, a relative orientation of image sensor and optical lens element and/or of image sensor and projection device can be constant.

Insofar as reference is made herein to corresponding (relative) orientations, this can refer in particular to the orientation during object capturing (i.e. during a measurement process) or else during an image recording. In particular, the explanations outlined herein concerning the orientations of the individual components can be applicable in the context where an object undergoes scanning.

Furthermore, the orientation of the projection device can generally be understood to mean the orientation (in particular the angle) of electromagnetic radiation emitted thereby, e.g. relative to an optical axis and/or relative to an axis that is orthogonal to the area of the image sensor.

By maintaining a corresponding constant orientation, it is possible to dispense with actuating mechanisms and/or actuators that enable the orientation of said components to be set actively (in particular to be set during an ongoing measurement process). This simplifies the system set-up. This is made possible by the image capturing disclosed herein, by means of which it is no longer absolutely necessary to comply with the Scheimpflug condition and thus the specific relative orientation—required for this purpose—of the relevant components with respect to one another. Instead, what can be achieved by recording an image with a varying focus setting is that for an object location for which the coordinates are intended to be determined, the associated focal plane is likewise traversed and associated depth or image information thus influences the measurement image generated.

In summary, the solution disclosed herein can be free of an actuator system for changing the orientation of the stated components relative to one another at least during an ongoing measurement process (i.e. during the ongoing object measurement) and/or ongoing measurement image capturing (i.e. exposure). In particular, at least one of the components (in particular the image sensor and/or the radiation generating device) can generally be stationary and/or immobile.

It is preferred in particular for the components (in particular the image sensor and the radiation generating device) to be arranged in a fixed relation with respect to one another, for example at a fixed distance and/or with a fixed orientation. An actuator system that moves the components jointly while maintaining the fixed relationship outlined can thus be provided.

If an actuator system is nevertheless provided, e.g. for calibration purposes or as a general setting possibility, it cannot be actuated and/or driven during an object measurement and/or measurement image capturing. In particular, it can (at least in the context of a single instance of measurement image capturing) alter or set the orientation of the image sensor relative to the radiation generating device and/or optical lens element independently of the requirements of the Scheimpflug condition. This, too, underlines the fact that compliance with the Scheimpflug condition is not absolutely necessary with the image capturing disclosed herein, which simplifies the measurement process overall.

Measurement image capturing can generally be present when, or can be present at least as long as, an image sensor exposure and/or measurement image recording are/is effected. It can thus be present as long as measurement values are captured in the context of a single image exposure. An object measurement can comprise just a single instance of measurement image capturing, but preferably a plurality in order to sense the object in a scanning fashion, for example.

If a plurality of measurement images are captured (for example by scanning or with a varying relative position with respect to the object), the object measurement can generally be present when, or can be present at least as long as, measurement images are captured and/or measurement values (for example distance information) and/or coordinate values are determined in the manner outlined herein. Before or after that, the orientation of the relevant components with respect to one another can optionally also be chosen differently than during the measurement process and the Scheimpflug conditions can then also theoretically be satisfied.

Generally, it should be noted that the solution presented herein does not presuppose that the Scheimpflug condition is not satisfied. Said solution thus functions even when said condition is satisfied. On the other hand, the present solution does not, however, presuppose that the Scheimpflug condition is mandatorily satisfied. This results in reduced requirements in respect of the orientation of the relevant components relative to one another, which is accompanied by the advantages outlined here.

In accordance with one development of arrangement, method and use, an orientation of the image sensor, of the optical lens element and of the radiation generating device with respect to one another, at least during an object measurement (and/or measurement image capturing), does not satisfy the Scheimpflug condition or at most satisfies it at infinity. The latter is the case, as outlined in the introduction, e.g. if the stated components or their planes defined thereby extend parallel to one another. Another way of stating that the arrangement does not satisfy the Scheimpflug condition (or at most satisfies it at infinity) is: the arrangement fails to satisfy a Scheimpflug condition short of infinity.

Provision can be made for the above situation in which the condition is not satisfied (or is satisfied at most at infinity) to be present at least during half of the object measurement (and/or measurement image capturing), that is to say during half of an object measurement duration or else while at least half of the object was being measured (that is to say half of a total region to be measured). In this disclosure, one characteristic described for an orientation is that the orientation fails to satisfy a Scheimpflug condition short of infinity. In other words: an orientation has this characteristic if the orientation does not satisfy the Scheimpflug condition; in addition, an orientation has this characteristic if the orientation satisfies the Scheimpflug condition only at infinity.

It is thus indeed possible for the case to occur in which by chance, for example, the Scheimpflug condition is satisfied at least temporarily. According to the invention, this is therefore not excluded, but on the other hand is not presupposed either. Instead, it is possible for satisfaction of the Scheimpflug condition even to be totally omitted, in particular during an entire measurement process or an entire object measurement. Instead, it is possible to effect the coordinate determination on the basis of the focus scanning image, and in particular the focus scanning image processed computationally in order to enhance the depth of field, in an at least similarly precise way, without compliance with the Scheimpflug condition having to be mandatorily ensured.

One development of the solution presented herein provides for the required duration for varying the focus setting to fall below the exposure time duration by at least half. To put it another way, it can be provided that during the exposure of the image sensor (that is to say the exposure time duration), on account of the faster focusing speed (or focus variation speed) in comparison, a plurality of focus settings can be implemented, in particular a scanning range of at least 1 mm-10 mm. This increases the probability that a focal plane in which an object location to be measured lies will be hit or captured. Suitable focusing optical units are mentioned e.g. in the scientific article cited above and in the references cited therein.

In accordance with a further embodiment, provision is made for the variation of the focus setting to be effected by means of at least one acousto-optical element (in particular an acousto-optical lens element) or a MEMS element (in particular a MEMS mirror array). In particular, the capturing device of the arrangement disclosed herein can comprise these elements.

In one development, at least one further radiation generating device is provided, wherein an orientation of the image sensor is constant during an object measurement and/or measurement image capture, independently of which of the radiation generating devices is activated.

A changeover or switchover between different radiation generating devices can be advantageous in order that the object is irradiated and/or illuminated as completely as possible. By way of example, it is thereby possible to react to any regions masked by object contours or these can likewise be illuminated. If instead one continued to operate e.g. just a single radiation generating device, the relative orientation of workpiece and radiation generating device would have to be changed in order to illuminate a corresponding masked region.

The invention also relates to a method for optical object measurement, comprising:
  radiating electromagnetic radiation onto the object;
  capturing a measurement image as a result of exposure of an image sensor with radiation returned (in particular reflected and/or scattered) from the object, wherein a focus setting is varied during the exposure;
  determining the coordinates of at least one location of the object.

Furthermore, the invention relates to the use of a capturing device for optical object measurement, wherein the capturing device comprises an image sensor, and is configured to capture a measurement image as a result of exposure of the image sensor with radiation reflected and/or scattered from the object (and preferably radiated thereon by means of a radiation generating device), and is furthermore configured to vary a focus setting during the exposure.

The method and the use can encompass all further features, aspects and developments for providing all of the effects, operating states and interactions outlined herein. In particular, all of the above explanations concerning arrangement features and developments thereof can also apply to the correspondingly worded method-use features or be provided therein. By way of example, provision can be made for the method and the use to be able to be carried out and/or implemented with arrangements in accordance with any of the embodiments outlined herein, in particular in such a way that all operating states of the arrangement are achievable.

BRIEF DESCRIPTION OF THE DRAWINGS

The invention is explained below with reference to the accompanying schematic figures. For features that are of the same type or have the same effect, the same reference signs can be used throughout the figures.

DETAILED DESCRIPTION

Figure 1:
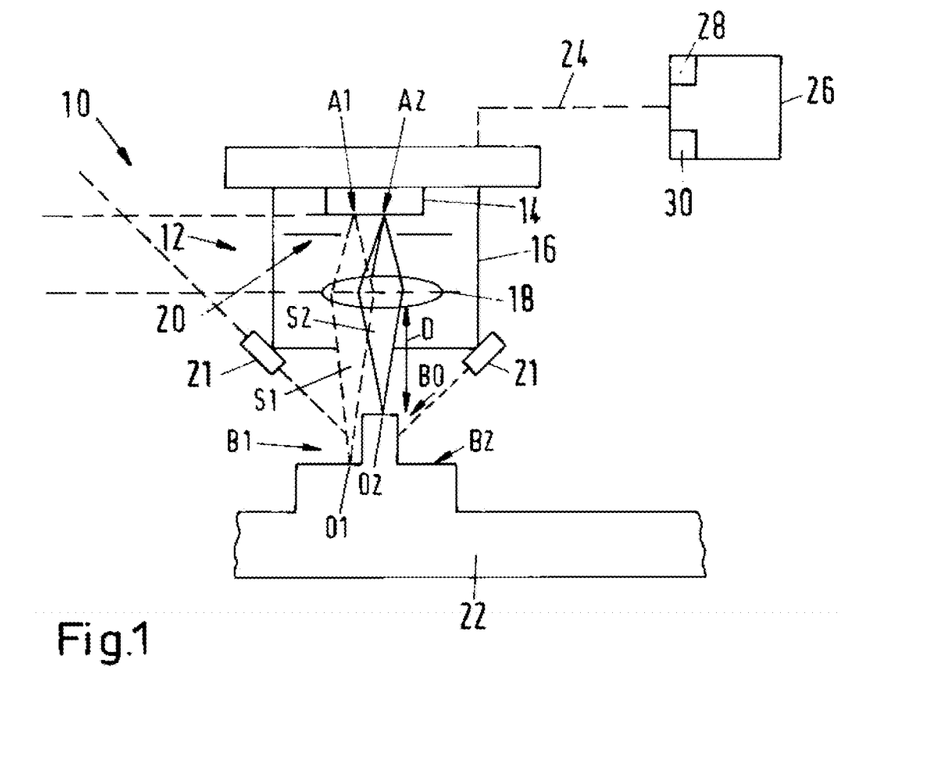
FIG. 1 is a functional block diagram of an arrangement according to the principles of the present disclosure.

FIG. 1 shows an arrangement 10 in accordance with example embodiments of the invention, wherein the arrangement 10 carries out the method according to the invention also explained below with reference to FIG. 2. For the sake of completeness, it should be mentioned that a use according to the invention of a capturing device for optical object measurement also takes place in this context.

The arrangement 10 comprises a capturing device 12 in the form of a digital camera. The latter comprises an image sensor 14, which, in a manner known per se, during an exposure generates a digital pixel value matrix as an image file. The latter is stored and used for a later evaluation. A lens arrangement 16 is furthermore shown, which, merely by way of example, comprises a single lens element 18. By means of the lens arrangement 18, it is possible to effect focus settings and in particular to vary the position of a focal plane or the focus distance D thereof as a focus setting.

The illustration of the lens arrangement 16 is merely schematic and by way of example. Background regarding the lenses and lens elements that can be used for the SSFS image capturing assumed herein can be found e.g. in the scientific article by Lu et al. cited in the introduction. Furthermore, a stop 20 is indicated merely schematically, which stop is opened for the purpose of image capturing and, more precisely exposure of the image sensor 14.

For recording focus scanning images (SSFS images), the stop 20 is opened and kept open while the focus distance D is varied by, for example, axial displacement of the lens element 18. A reflected and/or scattered radiation portion is continuously recorded in the process, such that intensity values captured by the image sensor 14 for different focus settings are superimposed on one another and jointly influence the image file finally produced. The displacement direction runs along the optical axis, that is to say perpendicularly to the area of the image sensor 14. It is preferred here for a rate of change of the focus distance D (that is to say the focusing speed) to be of a magnitude such that it is possible to effect exposures with a plurality of different focus settings (or focus distances D) within an exposure time. Merely by way of example, a focusing speed of 1 kHz by comparison with an image capturing rate of 300 Hz can be taken as a basis.

During the image capturing, it is furthermore preferred for the image situation to remain unchanged, that is to say e.g. for no relative movements with respect to the object 22 to take place or for at most such relative movements to take place which result in small instances of so-called blurring of, for example, less than 100 µm. Despite relative movement, it is then possible to assume a quasi-static case during a single instance of image capturing. By way of example, given a frame rate of 100 Hz a speed of relative movement of 3 mm/s may result in acceptable blurring of just 10 µm. Background concerning the problem of blurring during the imaging of moving objects can be found for example in EP 3 278 302 B1 in the name of the present applicant, in particular, [0017] therein.

It is preferred in particular for the image capturing device 18 or the lens 16 to be telecentric. It is furthermore preferred for the ambient conditions not to change during the capturing of a focus scanning image, which holds true in particular for an exposure situation.

That range within which the focus distance D is varied is also referred to as the focus scanning range. It relates to the difference or distance between the largest and smallest focus settings, i.e. the largest and smallest focus distances D in the present example.

An image (measurement image) captured in this way is communicated to an evaluation device 26, which is a computer device, via a data line 24 indicated in a dashed manner. Said device comprises a processor device 28 indicated schematically and a storage device 30 likewise indicated schematically. The processor device 28 is configured to execute algorithms stored e.g. on the storage device 30. By executing these algorithms (and/or generally program instructions contained e.g. in the algorithms), it is possible to effect a correction of the measurement image captured by the image capturing device 12 in accordance with any of the variants outlined herein, in particular in order to increase the depth of field. The finally corrected measurement image can be stored in the storage device 30.

Radiation generating devices 21 in the form of laser projectors, more precisely laser line projectors are also shown. During an object measurement, preferably only one of the radiation generating devices 21 is active at a given point in time, that is to say that only ever one laser line, and not two simultaneously, is projected onto the object. In a way that it is known per se the arrangement 10 thus operates in the manner of a laser line scanner in which the projected laser line is moved along a region of the object surface (by means of corresponding movement of arrangement 10 and object 22). At least one measurement image is then captured as focus scanning image in each position on or relative to the object surface.

The radiation incident on the object 22 (that is to say the incident laser light in the case shown) is reflected and/or scattered by the object surface and passes the open stop 20 onto the image sensor 14. Ambient light can be filtered out by optical filters (not shown). The image sensor 14 is thereby exposed and captures the intensity of the returned radiation for example as a plurality of individual pixel values within a two-dimensional pixel value matrix of a captured (object) image.

What is shown by way of example is the exposure or recording situation during the irradiation of two different object locations O1, O2, and also the beam path S1, S2 respectively present here, together with locations of impingement A1, A2 on the image sensor 14.

The position of the laser line can be identified in the captured images. The line runs along a horizontal axis in FIG. 1, that is to say perpendicularly to the arrow D into the plane of the drawing. For each (image) location along the (recorded) line, spatial (i.e. 3 dimensional) coordinates, and in particular coordinates in a depth direction or z-direction, can then be determined by means of triangulation algorithms known per se. To put it more precisely, the coordinates of the object locations O1, O2 are determined from which the radiation is returned to the locations of impingement A1, A2 if the laser line strikes the corresponding object locations O1, O2. To put it more precisely, the laser line is imaged at the locations of impingement A1, A2 if it strikes the object locations O1, O2, that is to say that the point of intersection there between the laser line and the surface of the object 22 is then imaged. The locations of impingement A1, A2 correspond to image locations with identical pixel coordinates, or pixel values in the recorded measurement image are captured for the locations of impingement A1, A2.

It is evident that positions of the locations of impingement A1, A2 vary depending on the height level and/or relative position of the object surface with respect to the active radiation generating device 21.

The image sensor 14 is areal, its second dimension extending into the plane of the drawing. As mentioned, the projected line is perpendicular to the plane of the drawing in FIG. 1. This corresponds to an orientation along a first axis of the area of the image sensor 14 or the latter's image coordinate system (or pixel matrix). In a way which again is known, the exact location of impingement A1, A2 on the image sensor 14 is determined for a plurality of points along the line in a second dimension or axis, preferably running perpendicularly thereto. For this purpose, the location of the maximum intensity of the returned radiation captured is determined by way of Gaussian fitting, for example. That is to say that for each image recording the coordinates for a multiplicity of corresponding locations of impingement A1, A2 are determined along the line.

In the example shown, this is done after the image has been completely recorded with variation of the focus setting D. Once the location of impingement A1, A2 has been determined for example, with knowledge of an angle (triangulation angle) between the area of the image sensor 14 and the radiation axes—indicated in a dashed manner—of the radiation generating devices 21, it is then possible to identify in particular the z coordinates of the object location O1, O2 which returned the radiation onto the corresponding location of impingement A1, A2. With the known X-Y-position of the image sensor 14, it is thus possible to determine the complete spatial coordinates of the object locations O1, O2.

Alternatively, the image sensor 14 can be calibrated by means of a suitable calibration body, such that an assignment of x-y-positions on the sensor to Z-Y-positions in the measurement volume is possible. The exact knowledge of the triangulation angle mentioned above is then not absolutely necessary any more.

It is evident in FIG. 1 that, on account of an uneven surface of the workpiece 22, the radiation generating devices 21 cannot irradiate all surface regions since instances of shading respectively occur. In this regard, by way of example, the radiation generating device 21 on the left in FIG. 1 cannot irradiate the surface region B2 and the radiation generating device 21 on the right cannot irradiate the surface region B1 since, from the point of view of the respective radiation generating device 21, these surface regions are masked by the central highest surface region B0. Depending on the surface region B0-B2 to be irradiated, a suitable radiation generating device 21 can thus be selected and activated.

Theoretically, just one radiation generating device 21 could be provided and then the arrangement 10 and the object 22 could be tilted (or rotated) relative to one another in order to irradiate (i.e. illuminate) all surface regions B1, B2. However, this is associated with a corresponding time loss and requires a certain complexity in the definition of the movements to be carried out. Therefore, this approach is preferably dispensed with in the solution presented herein.

The relevant lines or planes for the Scheimpflug condition are also indicated, these being illustrated in a dashed and elongated manner. It is evident that they do not intersect at a common point (not even at infinity). This would usually have the effect that not all the locations of infringement of the laser line on the object 22 can be imaged sharply within a single image recording, such that for example the position of the locations of impingement A1, A2 would also not be able to be determined precisely. Accordingly, in the prior art cited in the introduction, hitherto in particular the orientation of the image sensor 14 has been adapted actively (i.e. by way of an actuator system), in particular continuously during the measurement. This is done particularly if, in the arrangement 10, the laser line and the arrangement 16 for irradiating all the surface regions B1, B2 are tilted or moved relative to one another.

Such an actuator system and compliance with the Scheimpflug condition can be dispensed with, in principle, in the present case. Instead, variation of the focus setting D increases the probability that a sufficiently sharp imaging plane of the object 22 will be struck, i.e. at least one portion of the focal planes that are accurate or sharply image the object 22 will concomitantly have an influence within the recorded focus scanning image.

Subsequently, an image with enhanced depth of field is generated computationally by means of known image evaluation algorithms for generating EDOF images from SSFS recordings and optionally by means of the correction function explained in the introduction from the parallel patent application in the name of the present applicant. On the basis of this, coordinates of object locations O1, O2 (and in particular the position of the locations of impingement A1, A2 on the image sensor 14) are determined precisely.

In the present case, this also has the effect that it is possible to change over flexibly between the radiation generating devices 21 for object irradiation even during an ongoing measurement, without tiltings of components of the arrangement 10 (in particular of the image sensor 14) relative to the object 22 being mandatorily necessary.

Figure 2:
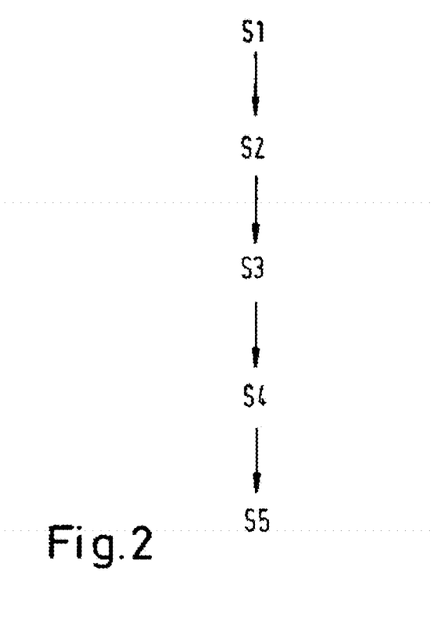
FIG. 2 is a schematic flowchart of an optical measurement method according to the principles of the present disclosure.

FIG. 2 shows a flowchart of a method for object measurement that can be carried out using the arrangement 10 from FIG. 1. In a step S1, a laser line is projected onto a surface region of the workpiece (i.e. of the object) 22 by means of one of the radiation generating devices 21.

In a step S2, the stop 20 is opened and directly afterward (that is to say as soon as the stop is open) the focus distance D as a focus setting is varied. An image recording (i.e. pixel value capturing) is effected by means of the image sensor 14 while this variation takes place. It is only when the focus setting has been completely varied (for example for traversing a predefined measurement region along the z-axis or perpendicularly to the plane 14) that the exposure and thus the image recording are ended. The recorded values (pixel values) then present can be stored as an image file and used for a further evaluation.

In step S2, the arrangement 10 and the workpiece 22 are situated in a first relative position with respect to one another and, more precisely, at a first position of a scanning path along which the object 22 is scanned by the arrangement 10.

In an optional step S3, the arrangement 10 is moved to the next position along the scanning path and analogous renewed image capturing is effected, as explained in step S2. This step can be repeated as often as desired until the scanning path has been completely traversed.

In a step S4, each image (measurement image) captured in steps S2/S3 is processed for the purpose of increasing its depth of field and/or its image contrast by means of the evaluation device 26.

In a step S5, in particular the depth coordinates of the individual object locations O1, O2 which lie along the projected laser line are determined on the basis of the processed images. For this purpose, locations of impingement A1, A2 on the image sensor 14 and, by way of triangulation (or by determining values assigned in the context of the calibration mentioned above), the coordinates of the object locations O1, O2 are determined in the manner explained above.

The solution shown can be used in particular for so-called inline measurement of workpieces 22, wherein workpieces 22 from ongoing production can be measured by the arrangement 10 shown for example while passing through a measuring station for the purpose of quality checking.

The phrase at least one of A, B, and C should be construed to mean a logical (A OR B OR C), using a non-exclusive logical OR, and should not be construed to mean "at least one of A, at least one of B, and at least one of C."

What is claimed is:

1. A system for optical measurement of an object, the system comprising:
    a radiation generating device configured to emit electromagnetic radiation onto the object;
    a capturing device including an image sensor, wherein:
        the capturing device is configured to capture a measurement image as a result of an exposure of the image sensor with radiation returned from the object, and
        the capturing device is configured to vary a focus setting during the exposure; and
    an evaluation device configured to determine coordinates of at least one location on a surface of the object based on the captured measurement image.

2. The system of claim 1 further comprising at least one additional radiation generating device configured to emit electromagnetic radiation onto the object.

3. The system of claim 2, wherein an orientation of the image sensor with respect to the radiation generating device and the at least one additional radiation generating device remains constant during the measurement image capture.

4. The system of claim 1, wherein the evaluation device is further configured to process the measurement image in order to increase at least one of a depth of field and an image contrast.

5. The system of claim 1, wherein the evaluation device is further configured to determine at least one location within the measurement image having an increased intensity of the captured radiation.

6. The system of claim 1, wherein the capturing device includes an optical lens element.

7. The system of claim 6, wherein the image sensor is immobile relative to the radiation generating device during the measurement image capture.

8. The system of claim 6, wherein the image sensor is immobile relative to the optical lens element during the measurement image capture.

9. The system of claim 1, wherein a required duration for varying the focus setting is less than half an exposure time duration.

10. The system of claim 1, wherein the capturing device includes at least one acousto-optical element.

11. The system of claim 1, wherein the capturing device includes a MEMS mirror array.

12. The system of claim 1, wherein an orientation of the image sensor is constant during the measurement image capture.

13. The system of claim 1, wherein an orientation of the image sensor with respect to the radiation generating device is constant during the measurement image capture.

14. A system for optical measurement of an object, the system comprising:
    a radiation generating device configured to emit electromagnetic radiation onto the object;
    a capturing device including an image sensor and an optical lens element, wherein:
        the capturing device is configured to capture a measurement image as a result of an exposure of the image sensor with radiation returned from the object, and
        the capturing device is configured to vary a focus setting during the exposure; and
    an evaluation device configured to determine coordinates of at least one location on the object based on the captured measurement image, wherein, during at least a portion of the measurement image capture, an orientation of the image sensor, an orientation of the optical lens element, and an orientation of the radiation generating device fail to satisfy a Scheimpflug condition short of infinity.

15. The system of claim 14, wherein, during the measurement image capture, an orientation of the image sensor, an orientation of the optical lens element, and an orientation of the radiation generating device fail to satisfy a Scheimpflug condition short of infinity.

16. A method for optical measurement of an object, the method comprising:
    radiating electromagnetic radiation onto the object;
    capturing a measurement image as a result of exposure of an image sensor with radiation returned from the object, wherein a focus setting is varied during the exposure; and
    determining coordinates of at least one location on a surface of the object based on the captured measurement image.

17. A system for optical measurement of an object, the system comprising:
    a capturing device including an image sensor;
    a radiation generating device configured to emit electromagnetic radiation on the object; and
    at least one additional radiation generating device configured to emit electromagnetic radiation onto the object,
    wherein the capturing device is configured to capture a measurement image as a result of exposure of the image sensor with radiation reflected from the object, and
    wherein the capturing device is further configured to vary a focus setting during the exposure.

* * * * *